United States Patent [19]

Schranz

[11] Patent Number: 5,127,007
[45] Date of Patent: Jun. 30, 1992

[54] SYSTEM WITH ELECTRONIC MODULES, HAVING AT LEAST ONE MICROPROCESSOR

[75] Inventor: Hans Schranz, Vienna, Austria

[73] Assignee: U.S. Philips Corporation, New York, N.Y.

[21] Appl. No.: 384,222

[22] Filed: Jul. 21, 1989

[30] Foreign Application Priority Data

Jul. 25, 1988 [AT] Austria ................................ 1899/88

[51] Int. Cl.⁵ .......................................... G06F 11/00
[52] U.S. Cl. ............................................... 371/18
[58] Field of Search ........... 371/18, 23, 25, 48, 371/16.1, 55, 56

[56] References Cited

U.S. PATENT DOCUMENTS

| | | | |
|---|---|---|---|
| 3,701,019 | 11/1972 | Jackson | 371/48 |
| 3,936,745 | 2/1976 | Harrington | 328/111 |
| 4,769,817 | 9/1988 | Krohn et al. | 371/23 |
| 4,813,042 | 3/1989 | Maale et al. | 371/25.1 |
| 4,866,713 | 9/1989 | Worger et al. | 371/25.1 |
| 4,967,347 | 10/1990 | Smith et al. | 371/23 |

Primary Examiner—Jerry Smith
Assistant Examiner—Phung M. Chung

[57] ABSTRACT

A system (1) with electronic modules (6, 7, 8, 9, 15, 19, 20, 27, 28, 35, 44) exhibits at least one microprocessor (6) for controlling the operation of the system (1) and which monitors the correct operation and, when it detects an operational fault, periodically repetitively generates a control signal which is associated with the operational fault detected in each case and which controls a warning signal generator (47) which, in correspondence with the control signal, generates a warning signal which is reproduced as perceptible warning event; the microprocessor (6) generates as control signals sequences (90) of binary-coded control pulse trains (91, 95) which consist of a number N of serially successive control pulse trains (91, 95) which are binary coded in accordance with the operational fault detected in each case, and the warning signal generator (47) generates, in correspondence with the sequences (90) of binary-coded control pulse trains (91, 95), sequences (97) of binary-coded warning signal trains (98, 102), which are reproduced as sequences (106) of binary-coded warning events (104, 105).

23 Claims, 2 Drawing Sheets

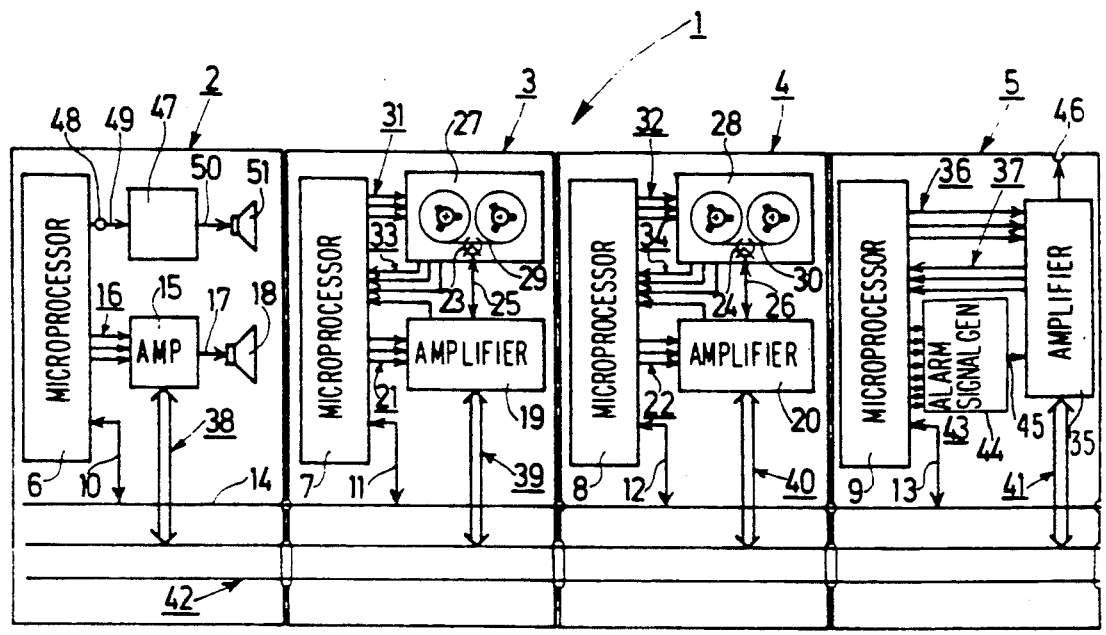
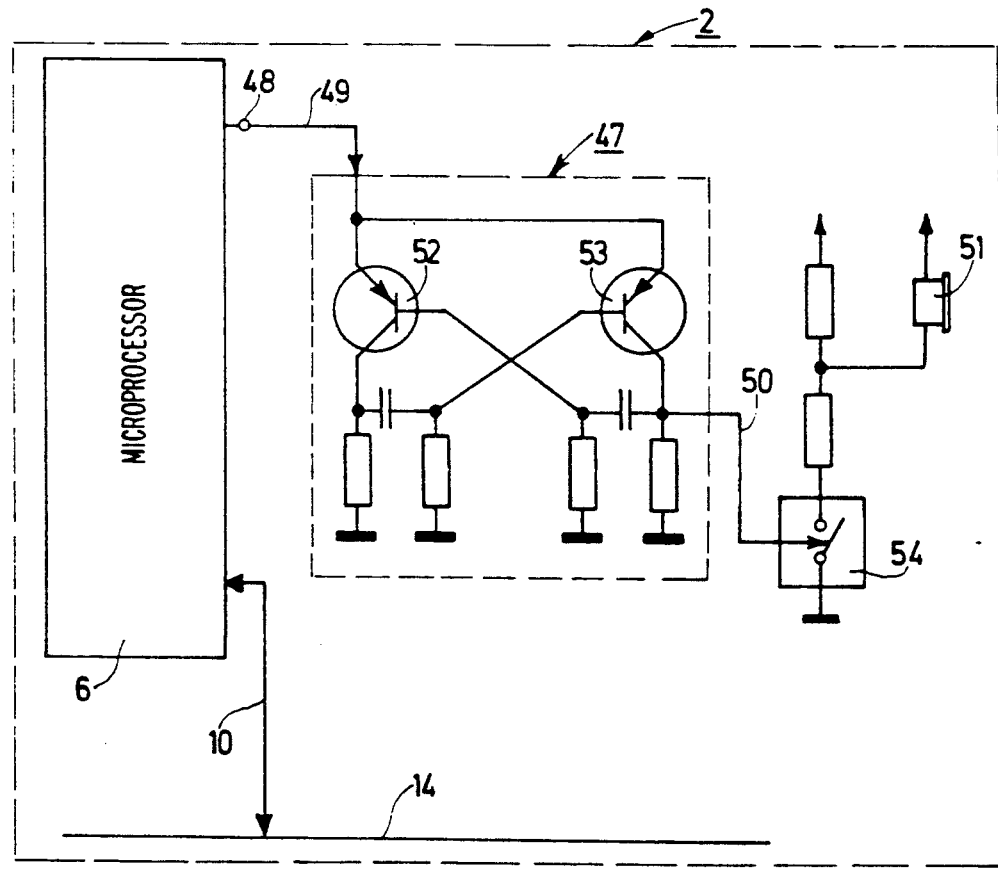

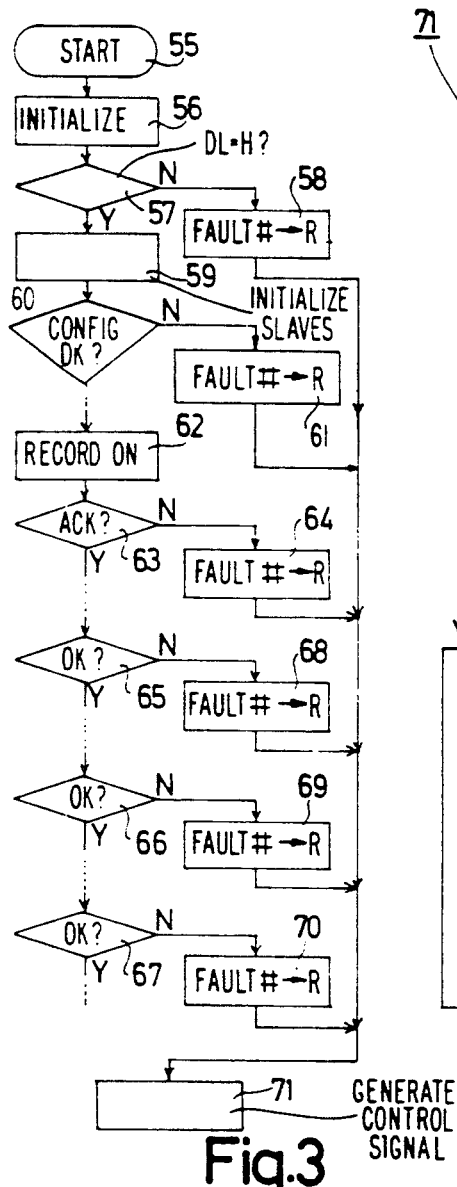
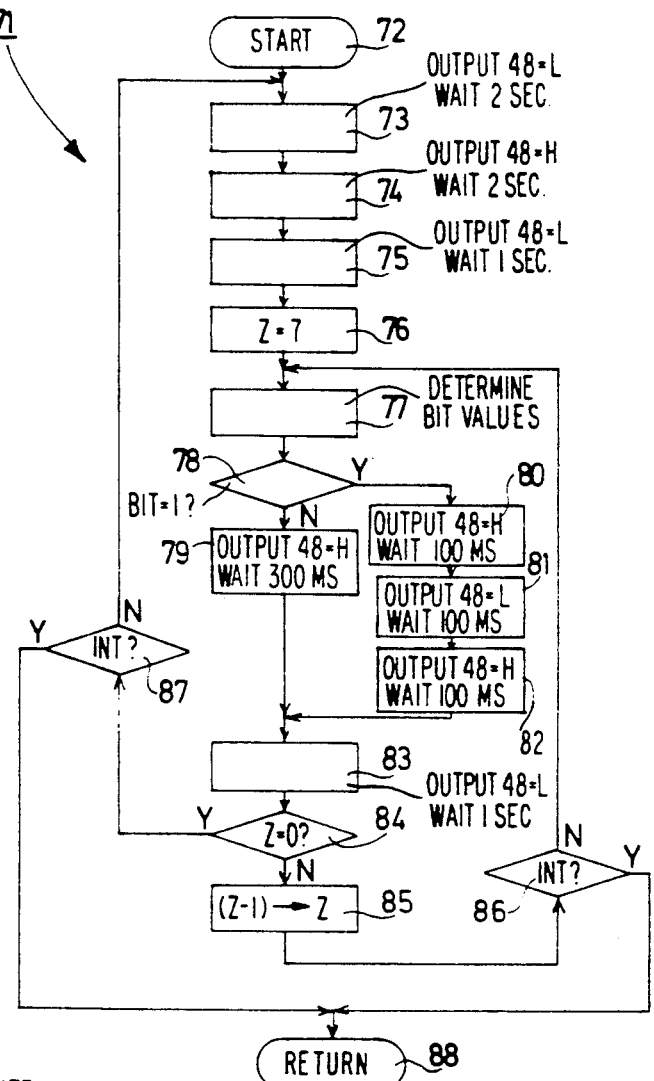
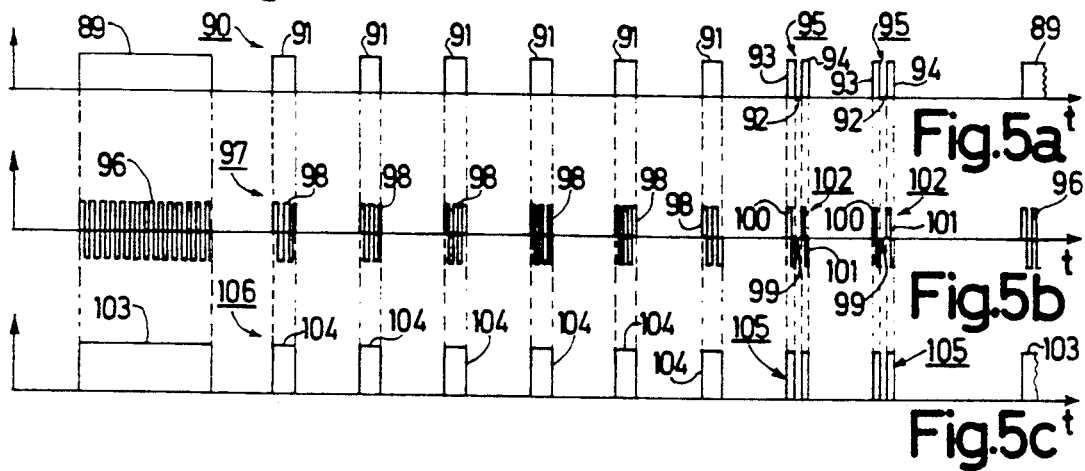
Fig. 3
Fig. 4
Fig. 5a
Fig. 5b
Fig. 5c

SYSTEM WITH ELECTRONIC MODULES, HAVING AT LEAST ONE MICROPROCESSOR

FIELD OF THE INVENTION

The invention relates to a system with electronic modules, having at least one microprocessor which is provided for controlling the operation of the system and which monitors the correct operation of the system and detects the occurrence of various operational faults and which, when an operational fault is detected, periodically repetitively generates a control signal which is associated with the operational fault detected in each case and which is supplied to a warning signal generator which, in accordance with the control signal supplied to it in each case, generates and outputs a warning signal which is reproduced as perceptible warning event which characterizes the operational fault detected in each case.

A commercially available system of the generic type initially mentioned is a so-called cassette changer into which several cassettes, each containing a magnetic tape as recording store, can be inserted and which can be connected to a telephone network via a telephone interface circuit in order to be able to record dictations, transmitted to the cassette changer via the telephone network by a user located at a remote location, on the magnetic tapes of the cassettes. For controlling its operation, the cassette changer includes a microprocessor which monitors the correct operation of the cassette changer. When various operational faults occur, the microprocessor generates control signals which are associated with these operational faults and which are supplied to a warning signal generator which thereupon generates warning signals which characterize the respective operational fault and which are reproduced as audibly perceptible warning events, that is to say as distinguishable warning tones. Some of these warning tones are only reproduced by the cassette changer itself in order to alert an operator of the cassette changer with respect to an operational fault detected, and other ones are only transmitted via the telephone interface circuit and the telephone network to the user located at the remote location where they are reproduced in order to alert the user with respect to an operational fault detected, and other ones are reproduced both by the cassette changer itself and also at the remote location. In this arrangement, the warning signal generator exhibits a programmable audio signal generator which is supplied in parallel manner with 8-bit words as control signals from the microprocessor and which generates, in accordance with the configuration of these 8-bit words, different warning signals which differ from one another in their frequency and/or duration. It has been found in such a system that the warning tones generated by means of these warning signals, which differ from one another with respect to their frequency and/or duration, are only reliably distinguishable by the users in a limited number. The misinterpretation of these warning tones greatly increases with a larger number of such warning tones. For this reason, only relatively few warning tones are generated in the known system so that attention can be drawn acoustically only to a correspondingly limited number of operational faults.

SUMMARY OF THE INVENTION

The invention has the object of eliminating the above-mentioned problems and developing a system that can be used for generating such perceptible warning events which can be easily and correctly distinguished from one another even with a large number of different warning events. For this purpose, in accordance with the invention the microprocessor periodically repetitively generates as control signals sequences of binary-coded control pulse trains which consist of a number N of serially successive control pulse trains which are binary coded in accordance with the operational fault detected in each case and which are supplied to the warning signal generator, and the warning signal generator generates and outputs as warning signals, corresponding to the sequences of binary-coded control pulse trains supplied to it, sequences of binary-coded warning signal trains which consist of the same number N of serially successive warning signal trains which are binary coded in correspondence with the binary-coded control pulse trains and which are reproduced as sequences of binary-coded warning events which consist of the same number N of serially successive warning events which are binary coded in correspondence with the binary-coded control pulse trains. The result of the binary coding of the warning events is that the sequences of warning events consisting of N individual warning events are only formed with the aid of two mutually different warning events, one of which represents a binary 0 and the other one of which represents a binary 1, which can be easily and correctly distinguished from one another by the users with any arbitary succession of these two warning events. This ensures that these sequences can be correctly distinguished even with a large number of different sequences of binary-coded warning events. Since the sequences of binary-coded warning events overall consist of N individual warning events each, a large number of different sequences of binary-coded warning events can be generated which differ in the succession of binary values represented by the binary-coded warning events, each such succession of the binary values characterizing a particular operational fault. If, for example, 8 is selected for the number N, a maximum of 256 different sequences of binary-coded warning events can be generated and, consequently, the same number of operational faults can be displayed and uniquely distinguished from one another. These sequences of binary-coded warning events can be acoustically perceptible binary-coded warning tone sequences or optically perceptible binary-coded warning light sequences which can be generated individually or jointly. For example, such binary-coded warning tone sequences can be directly acoustically reproduced by the system according to the invention, in which arrangement a user of the system can then determine, after listening to a periodically repetitively generated binary-coded warning tone sequence for several times, the sequence of the binary coding of the warning tones contained in it and from this can determine, for example using the aid of a list of the various operational faults, the operational fault detected by the microprocessor. If it is required, such binary-coded warning tone sequences reproduced by the system according to the invention can also be transmitted via a telephone receiver held close to the system, and a telephone network to a remotely located trained service technician who can then analogously determine the operational fault detected so that he can, for example, inform the user of the system of this via the telephone network or can prepare himself for a service visit. In this manner, the possibility also exists that some of the operational faults, particularly those attributable to operation errors, can be directly eliminated by the user of the system himself without the service technician having to come to the installation site of the system for this purpose.

The binary-coded control pulse trains successively generated by the microprocessor can be binary coded, for example, in their amplitude, in which arrangement the sequences of binary-coded control pulse trains are then formed with the aid of two control pulse trains having different amplitudes, for which, however, a specially designed microprocessor is required. It has been found to be advantageous if the binary-coded control pulse trains successively generated by the microprocessor are binary coded in their time sequence. No special microprocessor is required for this type of binary coding of the control pulse trains, rather it can be easily implemented by means of any simple microprocessor.

The control pulse trains, the time sequence of which is binary coded, can be formed, in accordance with their binary coding, for example, by two control pulse trains having a different number of pulse gaps or also by two gapless pulses of different length. However, it has been found to be particularly advantageous if the control pulse trains which are successively generated by the microprocessor and are binary coded in their time sequence are formed, in accordance with their binary coding, on the one hand by a gapless control pulse train consisting of one pulse and, on the other hand, by a control pulse train which exhibits a pulse gap and consists of two pulses separated from one another by the pulse gap. Two such binary-coded control pulse trains can be generated in a simple manner and are advantageous with respect to a simple generation of binary-coded warning events which are particularly clearly distinguishable from one another.

The binary-coded warning signal trains successively generated by the warning signal generator can be binary coded, for example, with respect to frequency or with respect to amplitude, the sequences of binary-coded warning signal trains being formed with the aid of two warning signal trains having different frequencies or different amplitudes. However, it has been found to be advantageous if the binary-coded warning signal trains successively generated by the warning signal generator are binary-coded in their time sequence. This type of binary coding of the warning signal trains is simple and can be implemented with little expenditure.

The warning signal trains, the time sequence of which is binary coded, can be formed, in accordance with their binary coding, for example by two warning signal trains exhibiting a different number of signal gaps or also by two gapless warning signal trains having a different length. However, it has been found to be particularly advantageous if the warning signal trains which are successively generated by the warning signal generator and are binary coded in their time sequence are formed, in accordance with their binary coding, on the one hand by a gapless warning signal train and, on the other hand, by a warning signal train which exhibits a signal gap and consists of two signal sections separated from one another by the signal gap. In this manner, sequences of binary-coded warning events are generated which have two warning events which are particularly clearly distinguished from one another so that these sequences of binary-coded warning events can be particularly easily and correctly distinguished from one another and detected. In the case of an acoustic reproduction of such warning signal trains, the time sequence of which is binary coded, one warning event is formed by a relatively long tone and the other warning event is formed by two successive shorter tones which are audibly absolutely reliably distinguishable from one another.

With respect to the generation of the binary-coded warning signal trains, it has been found to be advantageous if the warning signal generator includes an astable multivibrator which can be switched on and off in dependence on the binary-coded control pulse trains successively generated by the microprocessor and which outputs the binary-coded warning signal trains at one output of the latter. This provides a simple circuit configuration for the warning signal generation.

Due to the sequences of binary-coded control pulse trains which are periodically repetitively generated by the microprocessor, the generation of the sequences of binary-coded warning signal trains and the sequences of binary-coded warning events consequently generated by these also occurs in a periodically repetitive manner. To separate the periodically repetitively generated sequences of binary-coded control pulse trains from one another, for example, a predetermined relatively long interval can be provided between in each case successive sequences of binary-coded control pulse trains, as is also known from the known system initially mentioned which is constructed as cassette changer. However, it has been found to be advantageous if the microprocessor, before each of the periodically repetitively generated sequences of binary-coded control pulse trains, generates an initial control signal which is supplied to the warning signal generator, and the warning signal generator, with the initial control signal supplied to it in correspondence generates and outputs an initial warning signal which is different from the binary-coded warning signal trains and which is reproduced as initial warning event which is different from the binary-coded warning events. In this manner, a clearly perceptible active identification, formed by the initial warning event, is achieved before the beginning of each sequence of binary-coded warning events which even further facilitates the determination of the succession of binary values represented in the sequence of binary-coded warning events.

The initial warning signal can differ from the binary-coded warning signal trains, for example, with respect to amplitude or with respect to frequency. However, it has been found to be advantageous if the initial warning signal generated by the warning signal generator exhibits a duration which is different from the duration of the binary-coded warning signal trains. Such an initial warning signal is simple to generate and provides an initial warning event which differs clearly from the binary-coded warning events.

Furthermore, it has been found to be advantageous if, in a system composed of several modules which are electrically connected to one another and which each include a microprocessor, which communicate with one another via at least one data line for the purpose of data exchanging and of which at least one microprocessor monitors the correct operation of the system, the microprocessor monitoring the correct operation checks the data line with respect to its correct functioning in a test process and, when it detects a faulty data line, generates a sequence of binary-coded control pulse trains which corresponds to this operational fault. In this manner, it is achieved in such a system that a very important prerequisite for correct operation, namely that the microprocessors of such a system of modular composition can exchange data with one another, is checked and if this prerequisite is not met, a corresponding sequence of binary-coded warning events is generated.

In this connection, it has also been found to be advantageous if the microprocessor monitoring the correct operation checks in a test process the modular composition of the system composed of several modules, which must meet a specified operating regulation, with respect to its correct composition and, if it detects an irregular faulty modular composition of the system, generates a sequence of binary-coded control pulse trains corresponding to this operational fault. In this manner, another important prerequisite for correct operation, namely that the correct modular composition of the modularly composed system exists, is checked and if this prerequisite is not met, a corresponding sequence of binary-coded warning events is generated.

BRIEF DESCRIPTION OF THE DRAWING

In the text which follows, the invention is described in greater detail with reference to an illustrative embodiment shown in the drawings, to which, however, it should not be restricted. FIG. 1 diagrammatically shows a system for recording and reproducing voice signals on magnetic tapes, accommodated, for example, in cassettes and intended as recording stores, which is built up of different modules which can be assembled and each includes a microprocessor, and a control module which contains a microprocessor intended as master which monitors the correct operation of the system and which, when finding operational faults, generates sequences of binary-coded control pulse trains which control a warning signal generator for generating sequences of binary-coded warning signal trains. FIG. 2 diagrammatically shows a part of the control module of the system according to FIG. 1, in which arrangement the warning signal generator contained in this control module is shown in detail. FIG. 3 shows a section of a flow chart of the sections, which are essential in connection with the present invention, of an operating program for the microprocessor of the control module according to FIG. 2. FIG. 4 shows a flow chart of a subprogram for the microprocessor of the control module which is processed in the microprocessor of the control module for generating the sequences of binary-coded control pulse trains which control the warning signal generator for generating the sequences of binary-coded warning signal trains. FIGS. 5a, 5b and 5c show the progress over time of a sequence of binary-coded control pulse trains and the progress over time of a corresponding sequence of binary-coded warning signal trains, and, symbolically, the progress over time of a sequence of binary-coded warning tones generated by the acoustic reproduction of these sequences of binary-coded warning signal trains.

DESCRIPTION OF THE PREFERRED EMBODIMENTS

FIG. 1 shows a system 1 for recording and reproducing voice signals on magnetic tapes accommodated on or in cassettes and intended as recording stores, and for receiving and outputting voice signals via a telephone network. The system 1 is of modular construction and in the present case consists of four modules which are mechanically and electrically connected to one another and are assembled to form the system. These modules are a control module 2 which controls the entire system, a first recording and reproduction module 3 and a second recording and reproduction module 4 by means of which voice signals can be recorded on magnetic tapes accommodated in cassettes and can be reproduced from these, and a telephone interface module 5 by means of which voice signals can be received from a telephone network and output to the telephone network and in which control signals received via the telephone network can be processed for controlling operating functions of the system 1.

Each of the aforementioned modules 2, 3, 4 and 5 includes a microprocessor 6, 7, 8 and 9. These microprocessors cooperate in a so-called master/slave configuration, the microprocessor 6 of the control module 2 being provided as master and the other three microprocessors 7, 8 and 9 being provided as slaves. The microprocessor 6 of the control module 2, provided as master, has superordinate control of the operation of the system 1. For bidirectional exchanging of digital data among one another, the microprocessors 6, 7, 8 and 9 are connected via one connecting line 10, 11, 12 and 13 each to a data line 14 looped through all modules 2, 3, 4 and 5.

The control module 2 also contains an electronic voice signal amplifier circuit 15, the operation of which can be controlled by the microprocessor 6 via control lines 16 and the output signal of which is supplied via a signal line 17 to a loudspeaker 18 for acoustic reproduction.

The two recording and reproduction modules 3 and 4 also each contain an electronic recording and reproduction amplifier circuit 19 and 20, respectively, the operation of each of which can be controlled via control lines 21 and 22, respectively, by the microprocessors 7 and 8, respectively, and by means of which the voice signals supplied by them to one magnetic head 23 and 24 each via one signal line 25 and 26 each in recording mode and supplied to them via the relevant signal line 25 and 26 from the relevant magnetic head 23 and 24 in reproduction mode are processed. Each of the two magnetic heads 23 and 24 is a component of a partially electronic drive unit 27 and 28. The operation of the drive units 27 and 28, which are used for driving and scanning magnetic tapes 29 and 30 accommodated in cassettes not shown, can be controlled via control lines 31 and 32 by the microprocessors 7 and 8. From the recording and reproduction amplifier circuits 19 and 20 and from the drive units 27 and 28, signal lines 33 and 34 are conducted to the microprocessors 7 and 8 via which the microprocessors 7 and 8 can be supplied with information signals on operating conditions inside the recording and reproduction amplifier circuits 19 and 20 and the drive units 27 and 28. Such operating state information signals can signal to the microprocessors, for example, whether a cassette is inserted in a drive unit, whether a cassette inserted into a drive unit is protected against erasure, whether an end of a magnetic tape of a cassette inserted into a drive unit is reached, whether a magnetic tape of a cassette inserted into a drive has broken, whether the level of a voice signal to be recorded is sufficiently high, whether an erasing oscillator outputs an erasing signal, whether a recording and reproduction amplifier is switched to recording mode and the like.

The telephone interface module 5 also contains an electronic receiving and transmitting amplifier circuit 35, the operation of which can be controlled by the microprocessor 9 of this module 5 via control lines 36 and from which signalling lines 37 are conducted to the microprocessor 9, via which information signals on operating conditions within the receiving and transmitting amplifier circuit 35 can be supplied to the microprocessor 9. Such operating condition information signals can inform the microprocessor 9 about whether a telephone loop is closed, whether the level of a voice signal received via the telephone loop is sufficiently high, whether and which control signal for controlling an operating function of the system has been supplied to the telephone interface module 5 via the telephone network and the like.

The voice signal amplifier circuit 15 of the control module 2 and the two recording and reproduction amplifier circuits 19 and 20 of the recording and reproduction modules 3 and 4, and the receiving and transmitting amplifier circuit 35 of the telephone interface module 5 are each connected via a line connection 38, 39, 40 and 41 consisting of several lines to a voice signal line connection 42 consisting of several lines, which is looped through all modules 2, 3, 4 and 5 and via which voice signals can be exchanged between the amplifier circuits 15, 19, 20 and 35 which are connected to them via the line connections 38, 39, 40 and 41, such an exchange of voice signals between the individual modules being controlled by controlling the amplifier circuits 15, 19, 20 and 35 with the aid of the microprocessors 6, 7, 8 and 9.

In the telephone interface module 5, an electronic alarm signal generator 44, which is known per se and which can be controlled by the microprocessor 9 of this module via control lines 43, is provided, by means of which alarm signals can be generated which differ from one another in known manner in their frequency and/or duration. The alarm signals generated are supplied via a signal line 45 to the receiving and transmitting amplifier circuit 35 and supplied by the latter to a connection 46 of the telephone interface module 5, via which the alarm signals can be fed into a telephone network and can be supplied to a remotely located user of the system 1 for the purpose of alerting him. For example, such an alarm signal is transmitted to a user when the latter, by transmitting a corresponding control signal to the system 1 in one of the two recording and reproduction modules 3 and 4, wishes to switch on the recording function for the purpose of recording a dictation transmitted by him via the telephone line, but no cassette is located in this selected recording and reproduction module.

Furthermore, the control module 2 exhibits a warning signal generator 47 which can be controlled by the microprocessor 6, which is provided as master, of the control module 2 via a control line 49 connected to an output 48 of this microprocessor and which outputs at an output line 50 warning signals which are supplied to a loudspeaker 51 and are acoustically reproduced by the latter as warning tones.

FIG. 2 shows the warning signal generator 47 of the control module 2 in detail. As can be seen, this warning signal generator 47 is simply an astable multivibrator which is essentially constructed with the aid of two transistors 52 and 53. If a high potential H occurs at the output 48 of the microprocessor 6, the astable multivibrator 47 is switched on and begins to oscillate and outputs a pulse-shaped warning signal via the collector of the transistor 53 at the output line 50 forming the output of the multivibrator 47. The frequency of the pulse-shaped warning signal can be selected, for example, to be approximately 1000 Hz. The pulse-shaped warning signal is supplied to an electronic switch 54 which consists of a transistor stage, shown diagrammatically, which is periodically closed in accordance with the frequency of the pulse-shaped warning signal, as a result of which the loudspeaker 51, constructed as piezo-electric buzzer, is excited and outputs a warning tone with a frequency of about 1000 Hz.

In the text which follows, the parts, which are essential in connection with the present invention, of the operating program of the microprocessor 6 of the control module 2, which is provided as master, are described with reference to the flow chart shown partially in FIG. 3. The operating program is started at block 55. After that, the microprocessor 6 provided as master is initialized at block 56. After that, block 57 checks whether the data line 14, via which the microprocessors 6, 7, 8 and 9 are intended to communicate with one another, is in a correct operating condition which is the case in the present system if it is at a high potential H. If the test of block 57 has a negative result, in which case an operating fault exists, which is formed, for example, due to the fact that the data line 14 accidentally exhibits a short to earth due to a fault, a fault number corresponding to the operational fault found, in the present case, for example, the fault number "1", is entered into a fault number register R in block 58. If, in contrast, the test at block 57 has a positive result, the microprocessors 7, 8 and 9 intended as slaves are initialized at block 59, each of these microprocessors outputting a digital code signal identifying the type of module 3, 4 and 5 concerned to the microprocessor 6 provided as master, and the latter allocating a particular address to each microprocessor 7, 8 and 9 provided as slave. After that, a check is made at block 60 whether the module configuration of the system 1 is in order. In this connection, it must be noted that the modular composition of the system composed of different modules must meet a predefined operating regulation. For example, such a system must not exhibit more than two telephone interface modules, such a system must contain at least one recording and reproduction module but must not exhibit more than four such recording and reproduction modules. Thus, block 60 checks whether this operating regulation has been adhered to during the assembly of a system. This is done by the microprocessor 6, provided as master, checking the code signals identifying the type of the modules 3, 4 and 5 concerned, which had been transferred to it during initialization by the microprocessors 7, 8 and 9 provided as slaves. If the test at block 60 has a negative result, a fault number corresponding to the operational fault found in block 60 is entered into the fault number register R at block 61. For example, the fault number "2" in the present case. If, in contrast, the test at block 60 has a positive result, the program run is continued via further blocks not shown until block 62 is reached. At block 62, for example, a command signal for switching on the recording mode in the first recording and reproduction module 3 is generated which is transmitted to the microprocessor 7 of this module 3 via the data line 14. After that, block 63 checks whether the recording mode has been switched on in module 3. This is done by waiting for a predetermined period of time for an acknowledgement signal from the microprocessor 7 of the module 3 to the microprocessor 6 of the control module 2, which acknowledgement signal indicates that the recording mode has in fact been switched on in module 3. If the test at block 63 has a negative result. a fault number corresponding to the operational fault found in block 63 is entered into the fault number register R. For example. the fault number "k" in the present case. During the further program run. the correct operation and the execution of the operating functions of the system is monitored at a large number of points. which is indicated by blocks 65. 66 and 67 in the present flow chart. Whenever a test in one of the blocks 65, 66 and 67 has a negative result, a fault number corresponding to the operational fault found is entered into the fault number register R. In the present case. the fault number "n" is entered into the fault number register R at block 68, fault number "n+1" at block 69 and fault number "z" at block 70. After a fault number has been entered into the fault number register R which, according to the present flow chart, occurs at blocks 58, 61, 64, 68, 69 and 70, the program run is continued at block 71. At block 71, a subprogram for generating a control signal for the warning signal generator 47 is processed. The flow chart of this subprogram is shown in detail in FIG. 4 and is yet to be described in the text which follows.

As can be seen from the flow chart described with reference to FIG. 3, the microprocessor 6, provided as master, of the control module 2 monitors the correct operation of the system 1 and the correct execution of the operating functions of the system 1 and determines the occurrence of various different operational faults. When such an operational fault is detected, a fault number allocated to the operational fault found is entered into a fault number register R provided for this purpose. The flow chart according to FIG. 3 describes only three cases of operational faults in which a fault number is entered into the fault number register R. Such a fault number can be entered into the fault number register R in a variety of other cases, for example if no cassette is inserted in a recording and reproduction module 3 and 4, if a cassette inserted is protected against erasure. if the end of the magnetic tape of an inserted cassette is reached and the like.

As can be seen from the description now following, the microprocessor 6 of the control module 2 generates, when it detects an operational fault, in a periodically repetitive manner a control signal allocated to the operational fault found in each case. The control signal is supplied via the output 48 of the microprocessor 6 and the control line 49 to the warning signal generator 47 which generates in accordance with the control signal supplied to it in each case a warning signal which is supplied to a loudspeaker 51 which reproduces in accordance with the warning signal supplied to it an acoustically perceptible warning event.

In the text which follows, the flow chart of the subprogram for the periodically repetitive generation of the control signal for the warning signal generator 47 is described with reference to FIG. 4. The program run of the subprogram according to FIG. 4 is started at block 72. After that, the output 48 of the microprocessor 6 is switched to a low potential L for 1 second at block 73. After that, the output 48 is switched to a high potential H for 2 seconds at block 74. After that, the output 48 is switched to a low potential L again for 1 second at block 75. In this manner, a pulse-shaped initial control signal lasting 2 seconds is generated at block 74.

At the next block 76, the value "7" is entered into a bit counter Z. After that, the value of each bit, the bit number of which corresponds to the value in the bit counter Z, is determined from the fault number register R at block 77. Since previously the value "7" had been entered into the bit counter Z at block 76. the value of the most significant bit having the bit number "7" is accordingly determined from the fault number register R when the block 77 is processed for the first time. After that, block 78 checks whether the value of the bit determined at block 77 is equal to "1". If this test has a negative result, the output 48 of the microprocessor 6 is switched to a high potential H for 300 msec at block 79. In this manner, a gapless control pulse train consisting of a 300 msec long pulse which occurs for 300 msec is generated if the bit determined at block 77 does not exhibit the value "1" but the value "0". If the result of the test at block 78 is positive, the output 48 of the microprocessor 6 is first switched to a high potential H for 100 msec at block 80. After that, the output 48 is switched to a low potential L for 100 msec at block 81. After that, the output 48 is switched to a high potential H for 100 msec at block 82. In this manner, a control pulse train consisting of two pulses which are separated from one another by the pulse gap and each have a length of 100 msec and which occurs for 300 msec is generated if the bit determined at block 77 exhibits the value "1".

Both after block 79 and after block 82. the program run is continued at block 83, at which the output 48 of the microprocessor 6 is switched to a low potential L for 1 second. In this manner, an interval with a duration of 1 second is in each case obtained between the previously generated control pulse trains.

After that. block 84 checks whether the value in the bit counter Z is equal to "0". If the results of this test is negative, the value in the bit counter Z is afterwards decremented by the value "1" at block 85. After that, block 86 checks whether an interrupt command exists for interrupting the present program run. Such an interrupt command can be generated, for example, by operating an acknowledgement key. If the result of the test at block 86 is negative, the program run is continued at block 77, where the value of the bit having the next lower bit number is then determined from the fault number register R. The program run through blocks 77, 78, 79 and 80, 81, 82 and 83, 84, 85 and 86 is periodically repeated, during which process a sequence of control pulse trains corresponding to the bit sequence of the fault number stored in the fault number register R is generated, which sequence of control pulse trains exhibits a predetermined pulse train repetition frequency.

If it has been found at block 84 that the value in the bit counter Z exhibits the value "0", block 87 subsequently checks whether an interrupt command for interrupting the present program run exists, as is also the case at block 86. If the result of this test is negative, the program run is continued at block 73, where the sequence of control pulse trains is then generated again. As long as no interrupt command is found at block 87, therefore, each sequence of control pulse trains is periodically repetitively generated. If the result of the test at blocks 86 and 87 is positive, the program run is continued at block 88 at which the present subprogram is terminated.

Due to the execution of blocks 77, 78, 79 and 80, 81, 82 and 83, 84, 85 and 86, a sequence of binary-coded control pulse trains is generated as control signal which consists of eight serially successive binary-coded control pulse trains and the eight successive control pulse trains of which are binary coded in their time sequence in accordance with the operational fault found in each case. As long as block 87 is passed through during the execution of the entire program run, such a sequence of binary-coded control pulse trains is successively generated in periodically repetitive manner, an initial control signal being generated before each of these periodically repetitively generated sequences of binary-coded control pulse trains.

Such a sequence of binary-coded control pulse trains is shown in FIG. 5a and it is assumed as an example that the fault number "3" was entered into the fault number register R. In FIG. 5a, the initial control signal is designated by the reference number 89 and the sequence of binary-coded control pulse trains is designated by the reference number 90. The sequence 90 of control pulse trains, which are binary coded in accordance with the fault number "3" entered in the fault number register R, exhibits, in accordance with this binary coding, six gapless control pulse trains 91, adjoining the initial control signal, each consisting of one pulse and each corresponding to one binary zero and two successive control pulse trains 95 each exhibiting pulse gap 92 and each consisting of two pulses 93 and 94 separated from one another by the pulse gap 92 and each corresponding to a binary one. As can be seen, the two control pulse trains 91 and 95 of the sequence 90 are binary coded in their time sequence and the succession of the binary values represented by the binary-coded control pulse trains 91 and 95 identifies the operational fault detected, which is allocated the fault number "3" in the present case.

As mentioned, the periodically repetitively generated sequences 90 of binary-coded control pulse trains 91 and 95 are supplied via the control line 49 to the warning signal generator 47 constructed as astable multivibrator 47. In this arrangement, the astable multivibrator 47 generates the sequences of binary-coded warning signal trains shown in FIG. 5b. In correspondence with the initial control signal 89, the warning signal generator generates an initial warning signal 96. In correspondence with the sequences 90 of binary-coded control pulse trains 91 and 95, the warning signal generator generates sequences 97 of binary-coded warning signal trains which, in correspondence with each control pulse train 91, exhibit a gapless warning signal train 98 and, in correspondence with each control pulse train 95, exhibit a warning signal train 102 which exhibits a signal gap 99 and consists of two signal sections 100 and 101 separated from another by the signal gap 99. As can be seen, the two warning signal trains 98 and 102 are also binary coded in their time sequence.

The sequences 97 of binary-coded warning signal trains 98 and 102, described with reference to FIG. 5b, are acoustically reproduced as sequences of binary-coded warning tones with the aid of the loudspeaker 51, as is symbolically shown in FIG. 5c. In this arrangement, the initial warning signal 96 is reproduced as an initial warning tone 103 lasting 2 seconds. The warning signal trains 98 are each reproduced as warning tone 104 corresponding to a binary zero and lasting 300 msec. The warning signal trains 102 are each reproduced as warning tone 105 corresponding to a binary one and consisting of two tone sections lasting for 100 msec and interrupted for 100 msec. In this manner, a sequence 106 of warning tones is assembled from two warning tones 104 and 105 which are binary coded in their time sequence and which differ particularly distinctly from one another so that the binary coding can be correctly detected by listening and thus the succession of binary values represented by the total sequence 106 of binary-coded warning tones 104 and 105, and thus the operational fault identified by these, can be reliably correctly determined. Since in the present case the number of control pulse trains 91 and 95 of each sequence 90 of binary-coded control pulse trains and, correspondingly, the number of warning signal trains 98 and 102 of each sequence 97 of binary-coded warning signal trains and the number of warning tones 104 and 105 of each sequence 106 of binary-coded warning tones is selected to be 8, 256 different sequences can be formed and, correspondingly, attention can be acoustically drawn to 256 operational faults of the system 1.

The invention is not restricted to the illustrative embodiment described above. In the illustrative embodiment described above, the control pulse trains of the control pulse train sequences and the warning signal trains of the warning signal train sequences are binary coded in their time sequence. Other possibilities are also available for this coding. For example, the control pulse trains can be binary coded in their amplitude and the warning signal trains in their frequency, or the control pulse trains in their amplitude and the warning signal trains in their time sequence, or the control pulse trains in their time sequence and the warning signal trains in their amplitude or their frequency. The warning signal generator can also be implemented by means of the microprocessor itself, a warning signal generator which is external to the microprocessor then being unnecessary. If the warning signal generator is implemented by means of a microprocessor, it is advantageous to binary code the control signal trains of the warning signal train sequences in their time sequence. In the illustrative embodiment described, the microprocessors serially communicate via a single data line; it is also possible for the microprocessors to communicate in parallel via a databus formed from several lines which is monitored with respect to its correct operation by a microprocessor. The number of warning events of each warning event sequence does not need to exhibit the value 8, but rather can exhibit any arbitrary value per se, for example also the value 16, as a result of which the number of operational faults which can be indicated increases to a maximum of 65,536. The illustrative embodiment described is a system for the recording and reproduction of voice signals which exhibits electronic modules, that is to say a so-called dictating system. However, the measures according to the invention are also advantageous in other systems exhibiting electronic modules, having a microprocessor for controlling the system operation, for example in video recorders, television sets, electronic word processing devices, electronic printers, copying devices and the like. The measures according to the invention are also advantageous in systems which are composed of several such devices, for example in equipment combinations of devices of entertainment electronics such as an audio cassette recorder, a record player, a tuner, an amplifier and a video recorder, or in equipment combinations of domestic appliances such as electric cookers, dishwashers, washing machines, television sets and the like which are controlled by a personal computer, or in equipment combinations for word processing which are composed, for example, of an input keyboard unit, a display unit, a storage unit and a printer.

I claim:

1. A system of electronic modules, having a microprocessor which is provided for controlling the system's operation and which monitors the system's correct operation and detects various operational faults and which, when an operational fault is detected, periodically repetitively generates a control signal which is associated with the detected operational fault and which control signal is supplied to a warning signal generator which in response generates and outputs a warning signal which is reproduced by said system as a perceptible warning event which characterizes the operational fault detected in an associated particular case, in which system the microprocessor periodically repetitively generates as the control signal sequences of binary-coded control pulse trains which consist of a number N of serially successive control pulse trains which are binary coded in accordance with the operational fault detected in an associated particular case and which are supplied to the warning signal generator, and in which system the warning signal generator generates and outputs as warning signals, corresponding to the sequences of binary-coded control pulse trains supplied to said warning signal generator, sequences of binary-coded warning signal trains which consist of the same number N of serially successive warning signal trains which are binary coded in correspondence with the binary-coded control pulse trains and which are reproduced by said system as sequences of binary-coded warning events which consist of the same number N of serially successive warning events which are binary-coded in correspondence with the binary-coded control pulse trains.

2. A system according to claim 1, wherein the binary-coded control pulse trains successively generated by the microprocessor are binary-coded in a time sequence.

3. A system according to claim 2, wherein the control pulse trains which are successively generated by the microprocessor and are binary coded in a time sequence are formed, in accordance with an associated binary coding, by a gapless control pulse train consisting of one pulse and, by a control pulse train which exhibits a pulse gap and comprises two pulses separated from one another by the pulse gap.

4. A system according to claim 3, wherein the binary-coded warning signal trains successively generated by the warning signal generator are binary coded in a time sequence.

5. A system according to claim 4, wherein the binary-coded warning signal trains which are successively generated by the warning signal generator and are binary coded in a time sequence are formed, in accordance with an associated binary coding, by a gapless warning signal train and, by a warning signal train which exhibits a signal gap and comprises two signals separated from one another by the signal gap.

6. A system according to claim 5, wherein the warning signal generator comprises an astable multivibrator which is switched on and off in dependence on the binary-coded control pulse trains successively generated by the microprocessor and which outputs the binary-coded warning signal trains.

7. A system according to claim 6, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning signal which differs from the binary coded warning signal trains and which is reproduced as an initial warning event which differs from the binary-coded warning events.

8. A system according to claim 7, wherein the initial warning signal generated by the warning signal generator has a time duration which differs from time durations of the signals of the binary-coded warning signal trains.

9. A system according to claim 8, comprising several modules which are electrically interconnected, each of said modules including a microprocessor, said microprocessors communicating via at least one data line for the purpose of data exchange, at least one microprocessor monitoring correct operation of the system, the microprocessor monitoring correct operation checking the data line with respect to correct functioning of said data line in a test process and, when said monitoring microprocessor detects a faulty data line, said monitoring microprocessor generates a sequence of binary-coded control pulse trains which corresponds to the faulty data line.

10. A system according to claim 9, wherein said monitoring microprocessor checks in a test process for a modular composition of the system comprising said several modules and if an irregular faulty modular composition exists generates a sequence of binary-coded control pulse trains corresponding to said irregular faulty modular composition.

11. A system according to claim 5, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning signal which differs from the binary coded warning signal trains and which is reproduced as an initial warning event which differs from the binary-coded warning events.

12. A system according to claim 4, wherein the warning signal generator comprises an astable multivibrator which is switched on and off in dependence on the binary-coded control pulse trains successively generated by the microprocessor and which outputs the binary-coded warning trains.

13. A system according to claim 12, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning which differs from the binary coded warning signal trains and which is reproduced as an initial warning event which differs from the binary-coded warning events.

14. A system according to claim 4, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning signal which differs from the binary coded warning signal trains and which is reproduced as an initial warning event differs from the binary-coded warning events.

15. A system according to claim 3, wherein the warning signal generator comprises an astable multivibrator which is switched on and off in dependence on the binary-coded control pulse trains successively generated by the microprocessor and which outputs the binary-coded warning signal trains.

16. A system according to claim 3, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning signal which differs from the binary coded warning signal trains and which is reproduced as an initial warning event which differs from the binary-coded warning events.

17. A system according to claim 2, wherein the warning signal generator comprises an astable multivibrator which is switched on and off in dependence on the binary-coded control pulse trains successively generated by the microprocessor and which outputs the binary-coded warning signal trains.

18. A system according to claim 2, wherein the binary-coded warning signal trains successively generated by the warning signal generator are binary coded in a time sequence.

19. A system according to claim 2, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning signal which differs from the binary coded warning signal trains and which is reproduced as an initial warning event which differs from the binary-coded warning events.

20. A system according to claim 1, wherein the warning signal generator comprises an astable multivibrator which is switched on and off in dependence on the binary-coded control pulse trains successively generated by the microprocessor and which outputs the binary-coded warning signal trains.

21. A system according to claim 1, wherein the binary-coded warning signal trains successively generated by the warning signal generator are binary coded in a time sequence.

22. A system according to claim 1, wherein the microprocessor, before each of the periodically repetitively generated sequences of binary-coded control pulse trains, generates an initial control signal which is supplied to the warning signal generator, and wherein the warning signal generator, in correspondence with the initial control signal, generates and outputs an initial warning signal which differs from the binary coded warning signal trains and which is reproduced as an initial warning event which differs from the binary-coded warning events.

23. A system according to claim 1, comprising several modules which are electrically interconnected, each module including a microprocessor, said microprocessors communicating via at least one data line for the purpose of data exchange, at least one microprocessor monitoring correct operation of the system, the microprocessor monitoring correct operation checks the data line with respect to correct functioning of said data line in a test process and, when said monitoring microprocessor detects a faulty data line, said monitoring microprocessor generates a sequence of binary-coded control pulse trains which correspond to the faulty data line.

* * * * *